United States Patent [19]

Gardner et al.

[11] Patent Number: 5,453,057
[45] Date of Patent: Sep. 26, 1995

[54] BELT TENSIONER

[75] Inventors: David E. Gardner, Royal Oak; David B. Novak, Ann Arbor, both of Mich.

[73] Assignee: Dayco Products, Inc., Dayton, Ohio

[21] Appl. No.: 387,522

[22] Filed: Feb. 13, 1995

Related U.S. Application Data

[62] Division of Ser. No. 315,175, Sep. 29, 1994, Pat. No. 5,423,723, which is a continuation of Ser. No. 252,801, Jun. 6, 1994, abandoned, which is a division of Ser. No. 109,792, Aug. 20, 1993, Pat. No. 5,342,249, which is a division of Ser. No. 947,317, Sep. 18, 1992, Pat. No. 5,277,667.

[51] Int. Cl.⁶ .................................................... F16H 7/12
[52] U.S. Cl. .................................................... 474/135
[58] Field of Search ............................. 474/133, 134, 474/135

[56] References Cited

U.S. PATENT DOCUMENTS

| | | | |
|---|---|---|---|
| 4,728,318 | 3/1988 | Henderson | 474/135 |
| 4,886,483 | 12/1989 | Henderson | 474/135 |
| 5,030,172 | 7/1991 | Green et al. | 474/135 |
| 5,057,059 | 10/1991 | Sidwell et al. | 474/135 |
| 5,129,864 | 7/1992 | Quintus et al. | 474/135 |
| 5,190,502 | 3/1993 | Gardner et al. | 474/135 |
| 5,277,667 | 1/1994 | Gardner et al. | 474/135 |
| 5,342,249 | 8/1994 | Gardner et al. | 474/135 |

*Primary Examiner*—Roger J. Schoeppel
*Attorney, Agent, or Firm*—Joseph V. Tassone

[57] ABSTRACT

A belt tensioning system, a belt tensioner therefor and methods of making the same are provided, the belt tensioning system comprising a tensioner arm pivotally mounted to a support, and a wound coiled spring having opposed ends one of which is operatively interconnected to an abutment of the support and the other of which is operatively interconnected to the arm, the arm having a shoulder for being engaged by the one of the opposed ends of the wound coiled spring so as to permit removal of the arm and the wound coiled spring as a self-contained unit from the support when the arm is pivoted to a certain position where the shoulder of the arm engages the one end of the spring and effectively moves the one end of the wound coiled spring out of contact with the abutment of the support, the wound coiled spring comprising a helical spring having the opposed ends thereof comprising an inner end and an outer end, the one end of the wound coiled spring comprising the outer end thereof.

10 Claims, 6 Drawing Sheets

BELT TENSIONER

CROSS REFERENCE TO RELATED APPLICATIONS

This application is a divisional patent application of its parent patent application, Ser. No. 315,175, filed Sep. 29, 1994, now U.S. Pat. No. 5,423,723 which, in turn, is a continuation patent application of its parent patent application, Ser. No. 252,801, filed Jun. 6, 1994, now abandoned, which, in turn, is a divisional patent application of its parent patent application, Ser. No. 109,792, filed Aug. 20, 1993, now U.S. Pat. No. 5,342,249, which, in turn, is a divisional patent application of its parent patent application, Ser. No. 947,317, filed Sep. 18, 1992, now U.S. Pat. No. 5,277,667.

BACKGROUND OF THE INVENTION

1. Field of the Invention

This invention relates to a new belt tensioning system and to a new belt tensioner therefor as well as to new methods of making such a new belt tensioning system and such a new belt tensioner.

2. Prior Art Statement

It is known to provide a belt tensioning system comprising a support means having an abutment means, an endless transmission belt construction carried by the support means and arranged to move in a certain path relative to the support means, an arm pivotally mounted to the support means, a pulley rotatably carried by the arm and being in engagement with the belt construction, and a wound coiled spring having opposed ends one of which is operatively interconnected to the abutment means of the support means and the other of which is operatively interconnected to the arm whereby the force of the wound coiled spring tends to pivot the arm in a direction that urges the pulley against the belt construction with a force that tensions the belt construction. For example, see the U.S. patent to Henderson, U.S. Pat. No. 4,886,483.

It is also known to applicants to provide a belt tensioning system comprising a support means laving an abutment means, an endless transmission belt construction carried by the support means and arranged to move in a certain path relative to the support means, an arm pivotally mounted to the support means, a pulley rotatably carried by the arm and being in engagement with the belt construction, and a wound coiled spring laving opposed ends one of which is operatively interconnected to the abutment means of the support means and the other of which is operatively interconnected to the arm whereby the force of the wound coiled spring tends to pivot the arm in a direction that urges the pulley against the belt construction with a force that tensions the belt construction, the arm having a shoulder means for being engaged by the one of the opposed ends of the wound coiled spring by the force of the wound coiled spring so as to permit removal of the arm and the wound coiled spring as a self-contained unit from the support means when the arm is pivoted to a certain position where the shoulder means of the arm engages the one end of the wound coiled spring and effectively moves the one end of the wound coiled spring out of contact with the abutment means of the support means, the wound coiled spring comprising a helical spring having the opposed ends thereof comprising an inner end and an outer end, the one end of the wound coiled spring comprising the inner end thereof. For example see the copending patent application, Ser. No. 832,297, filed Feb. 7, 1992.

SUMMARY OF THE INVENTION

It is one of the features of the invention of the aforementioned copending patent application, Ser. No. 832,297, filed Feb. 7, 1992, to provide a new belt tensioning system wherein the belt tensioner comprises an arm and a wound coiled spring that can be carried by the arm so as to provide a self-contained unit and which when assembled to the support means of the system provides a means to transfer one end of the spring to an abutment means on the support means so that that end of the spring will be operatively interconnected to the support means and permit the force of the spring to provide a tensioning force on an endless transmission belt construction that is carried by the support means to move in an endless path thereon.

In particular, it was found according to the teachings of that invention that the arm of the belt tensioner can be provided with a shoulder means against which the one end of the wound coiled spring can engage so as to permit the arm and spring to be a self-contained unit to be inserted in the belt tensioning system and be removed therefrom and when assembled to the support means can transfer the engagement of that one end of the spring from the shoulder means of the arm to an abutment means on the support means to effectively interconnect that one end to the support means whereby the force of the spring tends to pivot the arm in a direction to apply a tensioning force to a belt construction that is engaged by a pulley rotatably carried by the arm.

Figure 2:
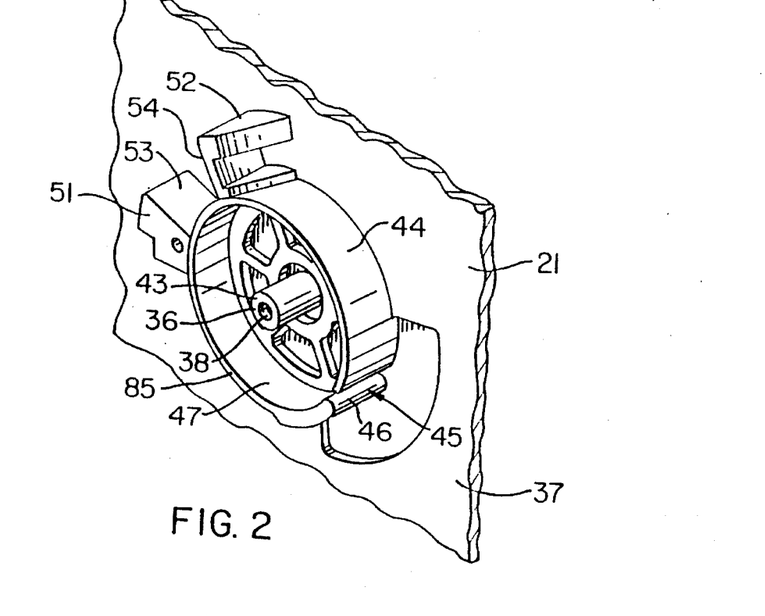
FIG. 2 is a view similar to FIG. 1 and illustrates the support means of the system of FIG. 1 when the belt tensioner and belt construction are removed therefrom.

However, in that invention, the one end of the spring comprised an inner end of the spring whereas it is now desired to have the one end of the spring comprising the outer end of the spring because the tensioner is to mount to a support means that is illustrated in FIG. 2 of this patent application.

Accordingly, one embodiment of this invention comprises a belt tensioning system comprising a support means having an abutment means, an endless transmission belt construction carried by the support means and arranged to move in a certain path relative to the support means, an arm pivotally mounted to the support means, a pulley rotatably carried by the arm and being in engagement with the belt construction, and a wound coiled spring having opposed ends one of which is operatively interconnected to the abutment means of the support means and the other of which is operatively interconnected to the arm whereby the force of the wound coiled spring tends to pivot the arm in a direction that urges the pulley against the belt construction with a force that tensions the belt construction, the arm having a shoulder means for being engaged by the one of the opposed ends of the wound coiled spring by the force of the wound coiled spring so as to permit removal of the arm and the wound coiled spring as a self-contained unit from the support means when the arm is pivoted to a certain position where the shoulder means of the arm engages the one end of the wound coiled spring and effectively moves the one end of the wound coiled spring out of contact with the abutment means of the support means, the wound coiled spring comprising a helical spring having the opposed ends thereof comprising an inner end and an outer end, the one end of the coiled spring comprising the outer end thereof.

Accordingly, it is an object of this invention to provide a new belt tensioning system having one or more of the novel features of this invention as set forth above or hereinafter shown or described.

Another object of this invention is to provide a new method of making such a belt tensioning system, the method of this invention having one or more of the novel features of this invention as set forth above or hereinafter shown or described.

Another object of this invention is to provide a new belt tensioner for such a belt tensioning system, the belt tensioner of this invention having one or more of the novel features of this invention as set forth above or hereinafter shown or described.

Another object of this invention is to provide a new method of making such a belt tensioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE REFERRED EMBODIMENT

While the various features of this invention are hereinafter illustrated and described as being particularly adapted to provide a belt tensioner for operating on a belt construction adapted to move in a certain path, it is to be understood that the various features of this invention can be utilized singly or in various combinations thereof to provide a belt tensioner for other systems as desired.

Therefore, this invention is not to be limited to only the embodiment illustrated in the drawings because the drawings are merely utilized to illustrate one of the wide variety of uses of this invention.

Figure 1:
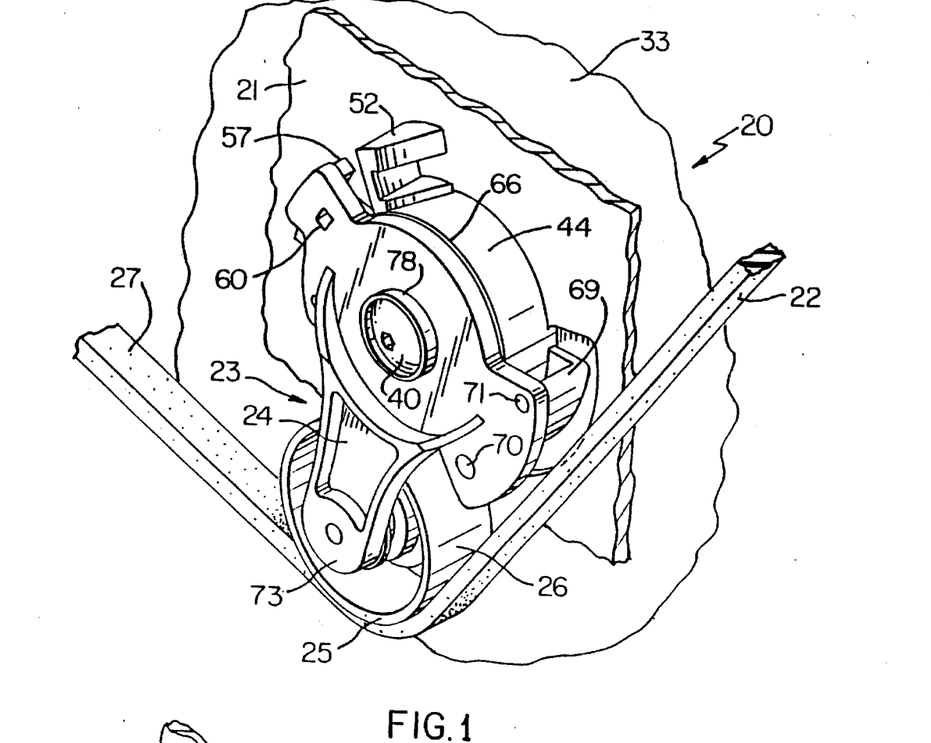
FIG. 1 is a fragmentary perspective view illustrating the new belt tensioning system of this invention utilizing the new belt tensioner of this invention.

Referring now to FIG. 1, the new belt tensioning system of this invention is generally indicated by the reference numeral 20 and comprises a support means 21, an endless transmission belt construction 22 that is carried by the support means 21 and is arranged to move in a certain path relative to the support means 21 and a belt tensioner of this invention that is generally indicated by the reference numeral 23 for tensioning the belt construction 22 in a manner hereinafter set forth.

Figure 12:
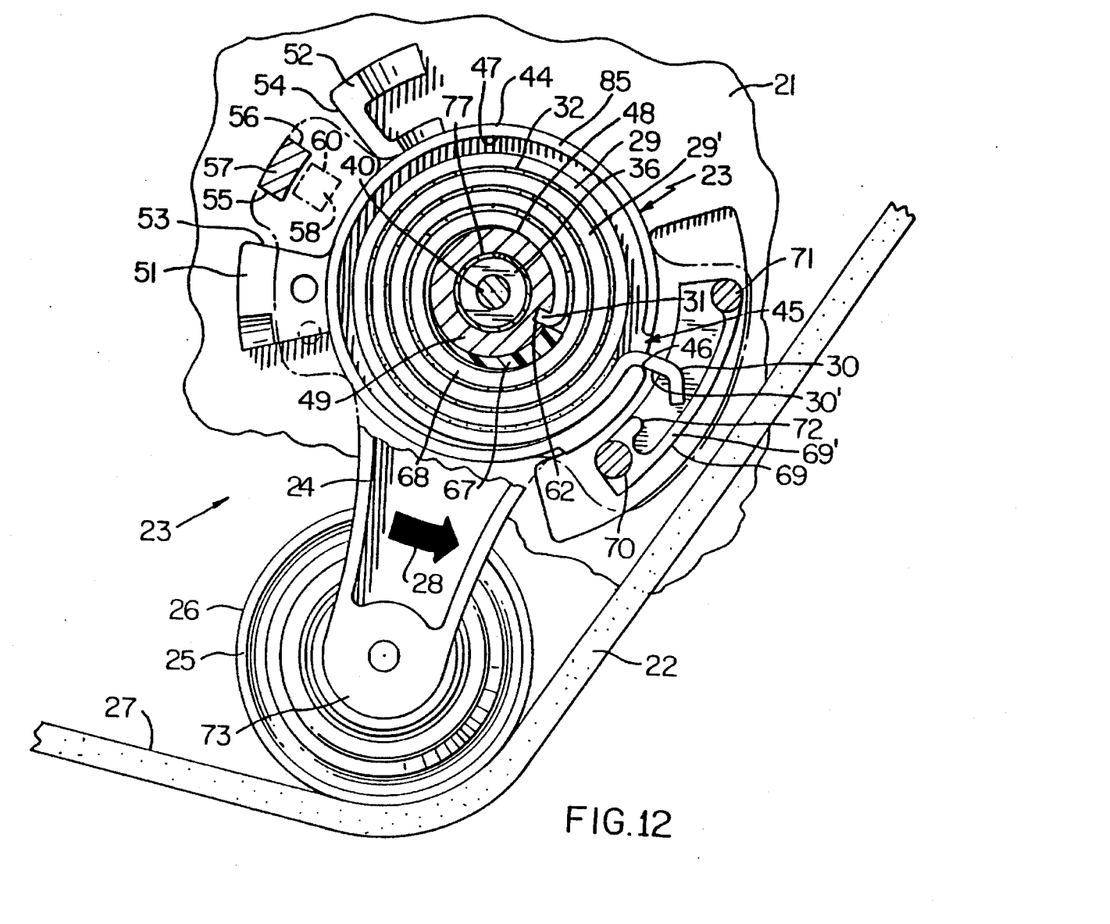
FIG. 12 is a view similar to FIG. 11 and illustrates the tensioner of FIG. 11 applying a tensioning force to a belt construction.

The belt tensioner 23 comprises a metallic or plastic arm 24 that is pivotally mounted to the support means 21 in a manner hereinafter set forth and carrying a rotatable pulley 25 that has a belt engaging surface 26 disposed in rolling engagement with the side 27 of the belt construction 22 and normally being urged in the direction of the arrow 28 in FIG. 12 by the force of a wound coiled spring 29 that has one end 30 thereof operatively interconnected to the support means 21 in a manner hereinafter set forth and the other end 31 thereof operatively interconnected to the arm 24.

The wound coiled spring 29 comprises a helically wound flat metallic wire spring means which may have the adjacent coils thereof interleaved with an anti-friction polymeric strip 32 whereby the spring means 29 functions in a manner well known in the art. For example, see the aforementioned U.S. patent to Henderson, U.S. Pat. No. 4,886,483, whereby this U.S. patent is being incorporated into this disclosure by this reference thereto.

The tensioner 23 of this invention is adapted to be inserted into the support means 21 and be removed therefrom with the spring means 29 being carried thereby in a self-contained manner. However, the spring means 29 is adapted to have the outer end 30 thereof effectively disconnected from the part 69 of the arm 24 and operatively interconnected to the support means 21 in a manner hereinafter set forth so that the force of the wound coiled spring means 29 tends to pivot the arm in the direction of the arrow 28 of FIG. 12 so that the pulley 25 will be urged against the belt construction 22 with a force that tensions the belt construction 22 all in a manner and for reasons that are fully set forth in the aforementioned U.S. patent to Henderson, U.S. Pat. No. 4,886,483, whereby only the details of the structure of the belt tensioning system 20 and belt tensioner 23 necessary to understand the features of this invention will be hereinafter described.

The support means 21 comprises a supporting structure 33, such as an internal combustion engine (not shown) of a transportation vehicle or the like (not shown), the support means 21 being a metallic or plastic cover, mounting plate or bracket that is fastened to the supporting structure 33 in any suitable manner, such as by bolts whereby the support means 21 is held fixed to the supporting structure 33.

Figure 3:
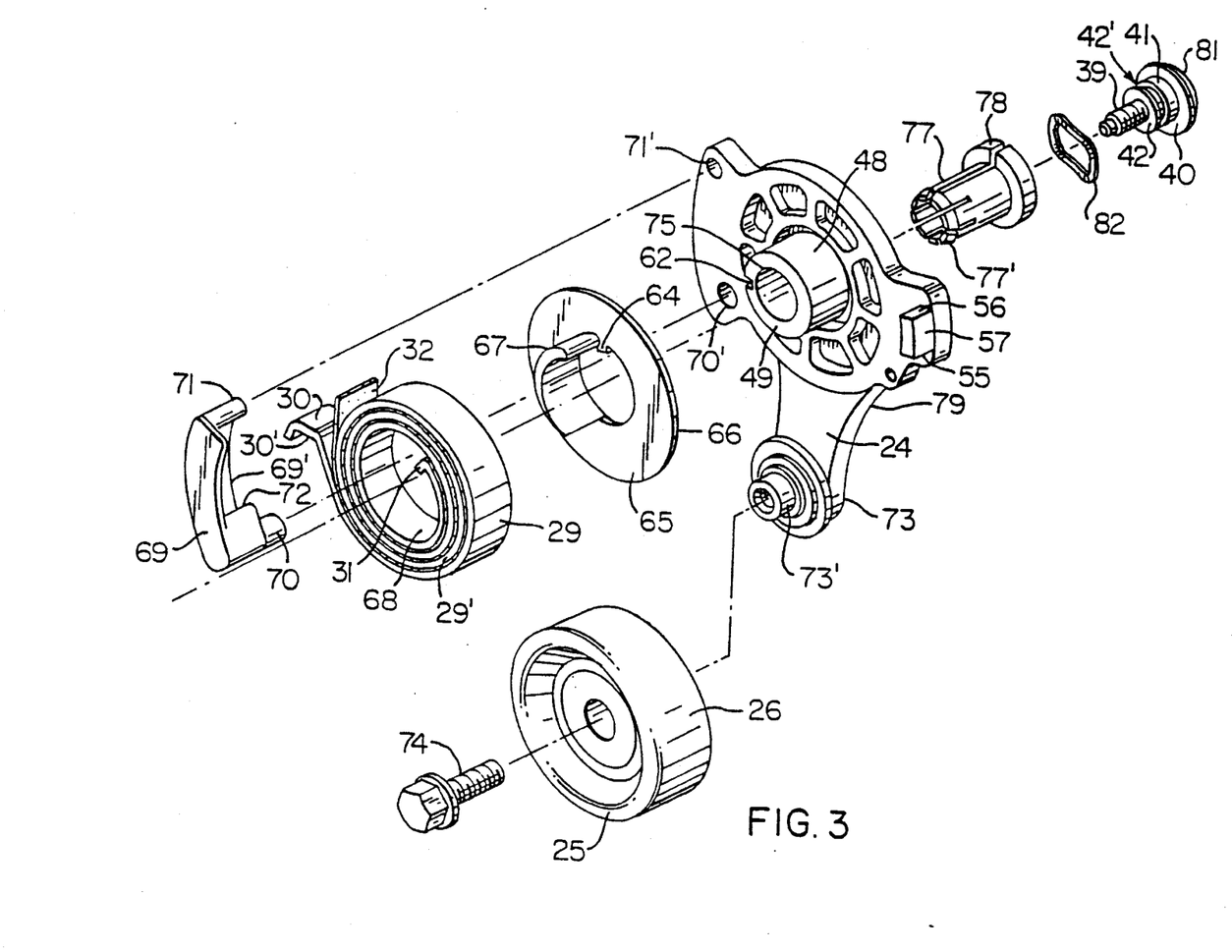
FIG. 3 is an exploded perspective view of the various parts that form the new belt tensioner of this invention.
Figure 4:
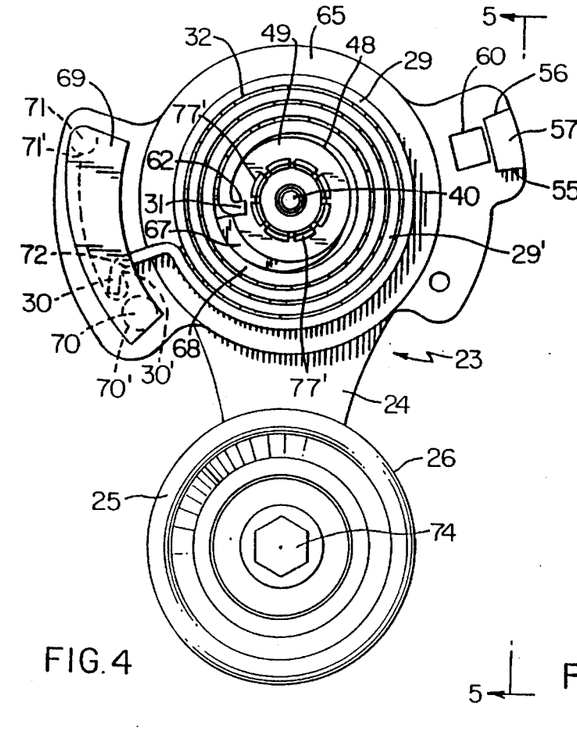
FIG. 4 is an enlarged rear view of the belt tensioner of this invention.
Figure 5:
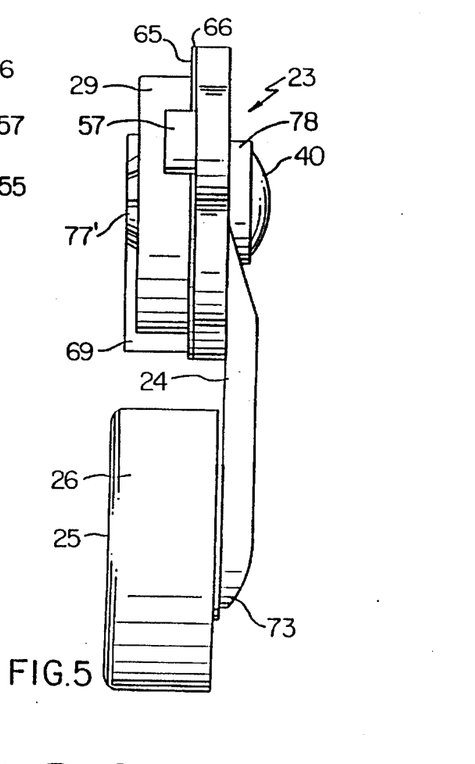
FIG. 5 is a side view of the belt tensioner of FIG. 4 and is taken in the direction of the arrows 5—5 of FIG. 4.
Figure 6:
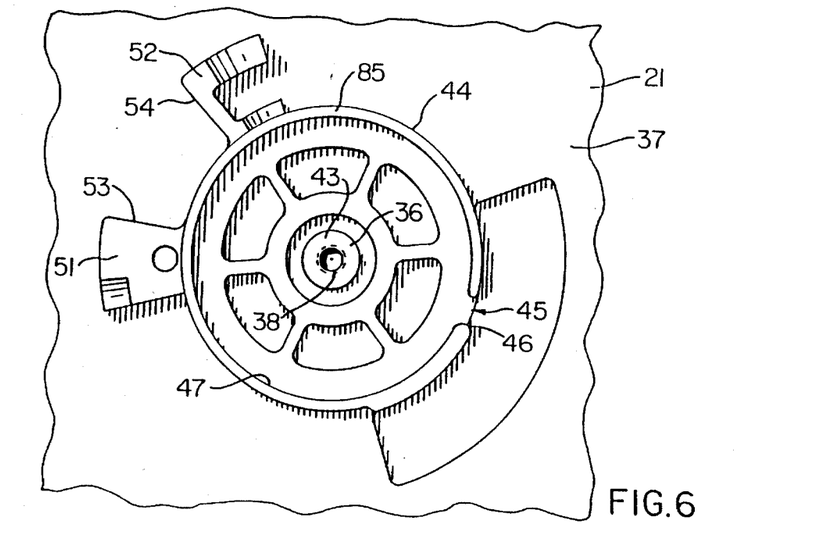
FIG. 6 is a fragmentary front view of the support means of FIG. 2.
Figure 9:
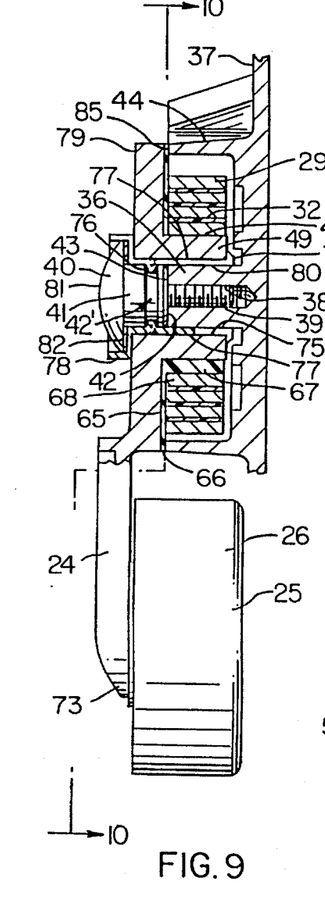
FIG. 9 is a fragmentary cross-sectional view taken on line 9—9 of FIG. 7.

The support means 21 as illustrated in FIGS. 2 and 6 has a cylindrical hub 36 extending outwardly from a side 37 of the support means 21 and is provided with an internally threaded opening 38 which is adapted to receive an externally threaded end 39 of a metallic fastening member 40 in a manner hereinafter set forth, the fastening member 40, as best illustrated in FIGS. 3 and 9, having an unthreaded enlarged cylindrical shank portion 41 joined to the threaded portion 39 by a transversely disposed flat shoulder 42 which is adapted to engage against a flat shoulder 43 on the cylindrical part 36 of the support means 21 as illustrated in FIG. 9 whereby the fastening member 40 is adapted to fasten the tensioner 23 to the support means 21 in a manner hereinafter set forth so that the fastening member 40 is fixed from movement relative to the support means 21.

The support means 21 has an annular wall 44 that extends outwardly from the side 37 thereof in a concentric manner about the cylindrical hub 36 and has a slot 45 formed therein and defining an abutment means 46 for having the end 30 of the spring 29 engaged thereagainst in the manner illustrated in FIG. 12 to operatively interconnect the end 30 to the support means 21 as will be apparent hereinafter.

The wall 44 of the support means 21 has an inner arcuate surface 47 adapted to be telescopically disposed with and spaced outwardly from an outer arcuate surface 48 on a cylindrical wall 49 of the arm 24 of the belt tensioner 23 in a manner hereinafter set forth.

The support means 21 has spaced apart walls 51 and 52 extending outwardly from the side 37 thereof with the walls 51 and 52 respectively defining surfaces 53 and 54 for respectively being engageable by surfaces 55 and 56 on a stop extension 57 of the arm 24 of the belt tensioner 23.

Figure 10:
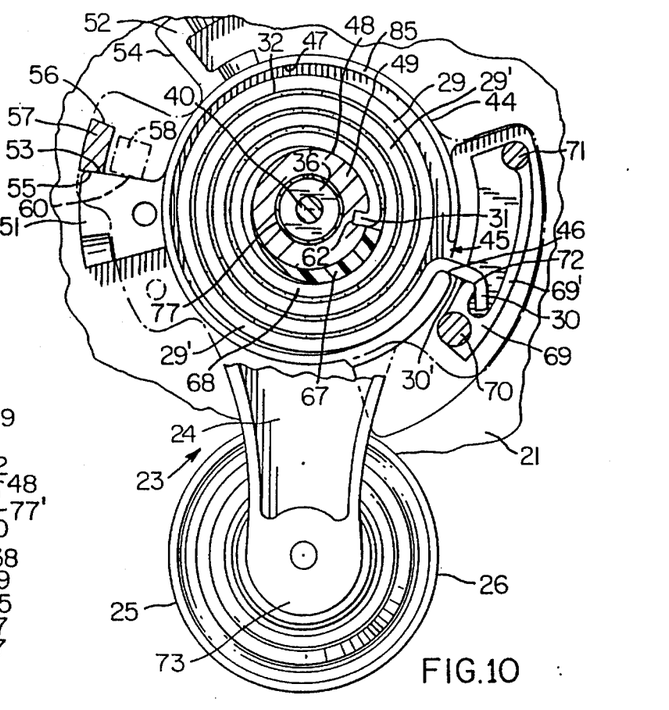
FIG. 10 is a fragmentary cross-sectional view taken on line 10—10 of FIG. 9.

In addition, the surfaces 53 and 55 are initial assembly alignment means. The surfaces 53 and 55 are parallel such that at initial contact, the surfaces 53 and 55 meet at one end thereof as illustrated in FIG. 10.

Figures 7, 8:
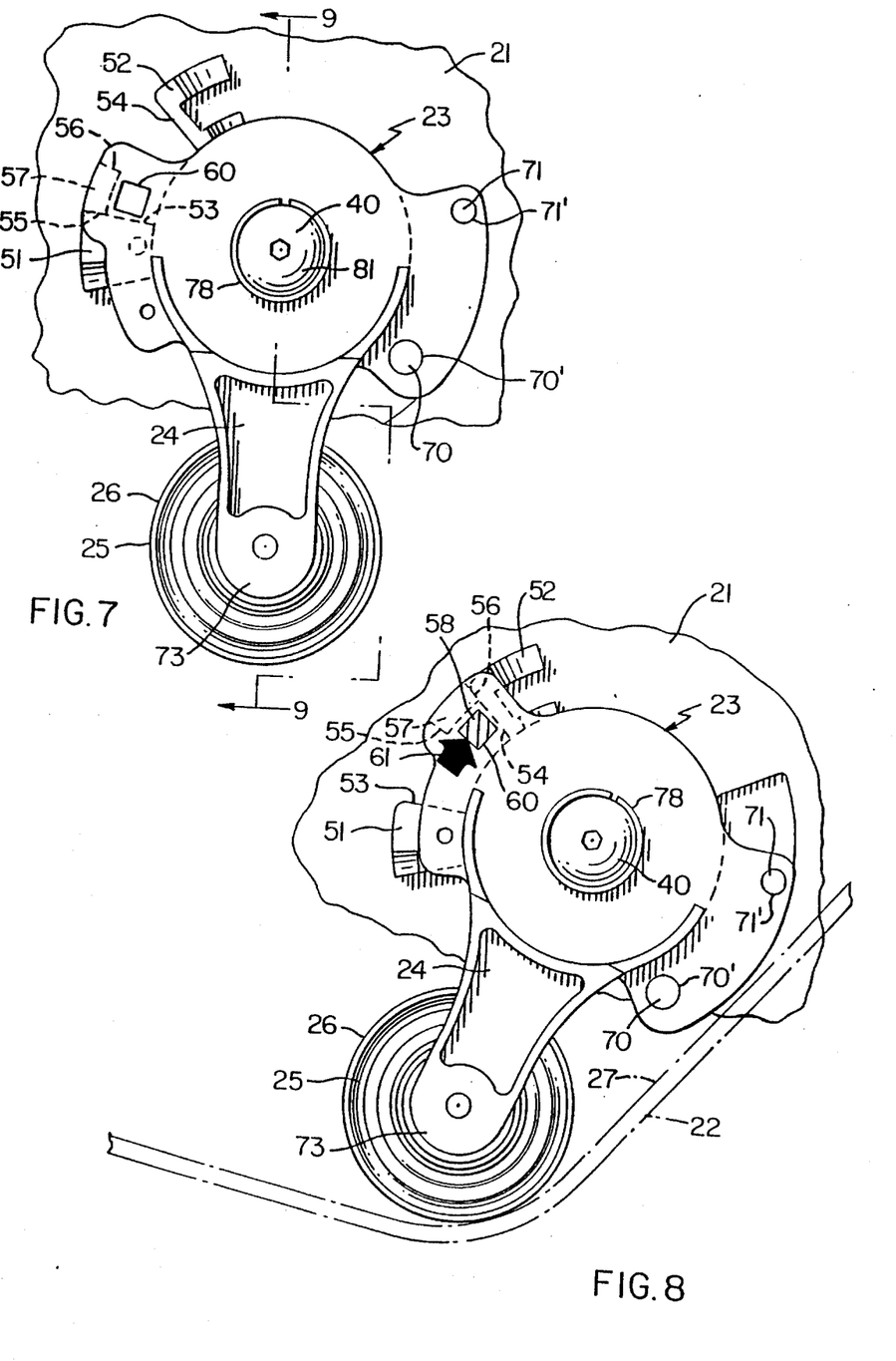
FIG. 7 is a reduced front view illustrating how the belt tensioner of FIG. 4 is initially assembled to the support means of FIG. 6.
FIG. 8 is a view similar to FIG. 7 and illustrates how the belt tensioner of FIG. 7 is to be pivoted in order to permit the same to apply a tensioning force to a belt construction that is illustrated in phantom lines in FIG. 8.

When the tensioner 23 is first mounted to the support means 21 as illustrated in FIG. 7, the fastening member 40 is threaded into the opening 38 in the cylindrical hub 36 and secured thereto. Then, when the belt tensioning system 20 is first utilized to apply tension to the belt construction 22 as shown in FIG. 8, a suitable tool 58 is disposed in a rectangular opening 60 in the arm 24 by an operator for rotating the arm 24 in the manner illustrated by the arrow 61 in order to assemble the belt construction 22 in the system 20 and permit the pulley 25 to apply its tensioning force when the tool 58 is removed from the opening 60 all in a manner well known in the art.

As best illustrated in FIG. 3, the wall 49 of the arm 24 has a slot 62 therein that receives a tang 64 on a disc portion 65 of an anti-friction member 66 that is telescoped on the cylindrical wall 49 and has an arcuate flange 67 for being inserted under the first inner coil 68 of the spring 29 for the reasons fully set forth in the aforementioned patent to Henderson, U.S. Pat. No. 4,886,483.

A part or member 69 forms a portion of the arm 24 when assembled thereto, the part 69 having a pair of spaced apart posts or rods 70 and 71 that are respectively adapted to be received in openings 70' and 71' of the arm 24 until a surface 69' of the part 69 abuts the arm 24 as illustrated in FIG. 1. The part 69 also has a shoulder means 72 against which the outer end 30 of the spring is adapted to engage.

In this manner, when the wound coiled spring 29 is assembled to the arm 24, the inner end 31 of the spring 29 is adapted to be disposed in the slot 62 of the wall 49 so as to be interconnected to the arm 24, while the outer end 30 is disposed against the shoulder means 72 of the part 69, the spring 29 in such assembled condition still being in a wound condition thereof so that the same has a force tending to unwind the coils 29' thereof in a manner well known in the art so that the spring 29 remains in its assembled condition by the spring force thereof.

Figure 11:
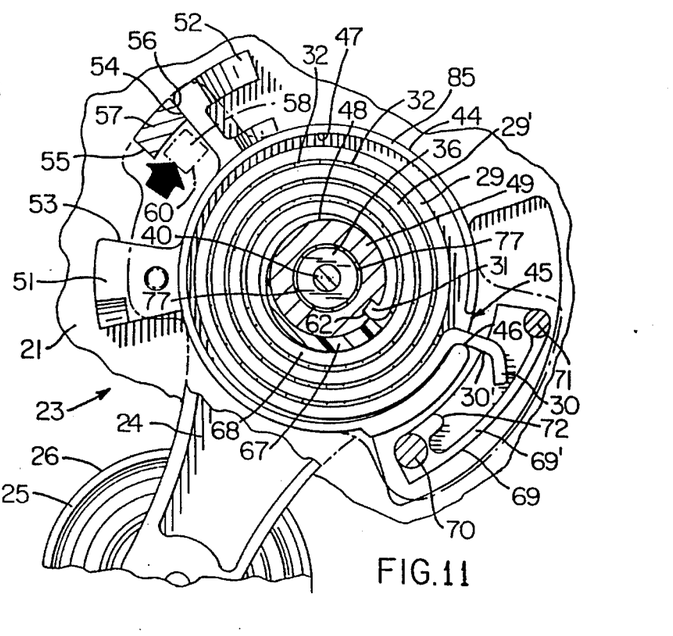
FIG. 11 is a fragmentary view similar to FIG. 10 and illustrates the tensioner disposed in a tensioning position thereof.

The end 31 of the spring 29 is disposed substantially at a right angle relative to the inner coil 68 of the spring 29 while the outer end 30 is looped as illustrated in FIGS. 10 and 11.

The spring 29 can have its inner end 31 inserted in the slot 62 of the wall 49 of the arm 24 and the outer end 30 of the spring 29 is engaged by a suitable tool (not shown) and is wound into a position beyond the location of the surface 72 of the part 69. The posts 70 and 71 of the part are then disposed respectively into the openings 70' and 71' and pushed therein. The post 70 is then affixed to the arm 24 by any suitable means, such as by bolting, brackering, staking, soldering or welding. Thereafter the spring 29 is unwound by the tool (not shown) to engage the surface 30' of the spring against the shoulder means 72 of the part 69 which is now part of the arm 24.

The pulley 25 is adapted to be rotatably mounted on a cylindrical shaft means 73' at the end 73 of the arm 24 and fixed thereto, such as by a threaded fastening member 74 in a manner well known in the art whereby the pulley 25 is adapted to rotate relative to the arm 24.

The arm 24 is adapted to be rotatably mounted on the cylindrical hub 36 of the support means 21 as will be apparent hereinafter as a cylindrical opening 75 passes through the central hub portion or wall 49 of the arm 24 and is adapted to be lined with a cylindrical bushing 77 formed of any suitable anti-friction material, such as a polymeric material, that has an enlarged flanged end 78 adapted to be disposed against a side 79 of the arm 24 as illustrated in FIG. 9.

In this manner, the fastening member 40 is adapted to have the cylindrical portion 41 thereof disposed in an opening 80 of the cylindrical portion of the bushing 77 as illustrated in FIG. 9 and have an enlarged head 81 thereof compact biasing means, such as a wavy washer 82 between the head 81 and the flange structure 78 of the bushing 77 so as to compact the same against the side 79 of the arm 24 when the threaded portion 39 of the fastening member 40 is fully threaded into the threaded opening 38 of the support means 21 in the manner illustrated in FIG. 9. In this manner, the flat shoulder 42 of the fastening member 40 abuts against the flat shoulder 43 of the projection 36 as illustrated in FIG. 9 whereby the fastening member 40 is held from rotation while the arm 24 is adapted to pivot or rotate relative thereto on the bushing 77 and, thus, pivot relative to the support means 21 even though the force of the biasing means 82 has axially moved the arm 24 on time fastening member 40 until the disc portion 65 of the anti-friction member 66 engages a facing surface means 85 of the annular wall 44 of the support means 21 for subsequent sliding movement thereon.

However, in order to retain the fastening member 40 in its assembled relation with the arm 24 and spring 29 when the belt tensioner 23 is separate from the support means 21, the cylindrical bushing 77 has a raised ledge 76 which engages with the fastening member 40 in an annular slot 42' thereof in its assembled relation with the bushing 77 and the arm 24 to retain the fastening member 40 thereto. The bushing 77 has means 77' at the end thereof for snap-fitting to the annular wall portion 49 of the arm 24 when completely pushed through the opening 75 of the wall 49 as illustrated in FIG. 9.

Thus, it can be seen that the belt tensioner 23 of this invention can be formed of relatively few parts by the method of this invention to provide a self-contained unit that comprises the arm 24, the pulley 25 and the wound coiled spring 29 which results in a relatively inexpensive belt tensioner through the change in the design thereof over the design of prior known belt tensioners, such as the belt tensioner set forth in the aforementioned U.S. patent to Henderson, U.S. Pat. No. 4,866,483.

When it is desired to assemble the belt tensioner 23 of this invention, in the system 20 which has the support means 21 previously fastened to or to be subsequently fastened to the support structure 33 by the bolts or other means in the manner previously set forth, the belt tensioner 23 is assembled thereto in the manner illustrated in FIGS. 7 and 10 whereby the outer end 30 of the spring 29 is disposed in the slot 45 of the wall 44 and the surface means 55 and 56 of the arm 24 are disposed between the means surface 53 and 54 of the support means 21 while the stop surface 55 of the extension 57 slides in spaced relation past the stop surface 53 of the wall 51 of the support means 21. In addition, the wall 49 telescopes over the wall 36 of the support means 21 and the outer end 30 of the spring 29 slips over the abutment means 46 of the wall 44 of the support means 21 in tile manner illustrated in FIG. 10.

The fastening member 40 then has its threaded portion 39 threaded into the threaded opening 38 of the Projection 36 until the annular shoulder 42 of the fastening member 40 abuts against the surface 43 of the Projection 36 in the manner illustrated in FIG. 9 so that the biasing means 82 is compacted between the enlarged head 81 of the fastening member 40 and the flange 78 of the bushing 77 so as to compact the flange 78 of the bushing 77 against the side 79 of the arm 24 and compact the disc portion 65 of the member 66 against the facing surface means 85 of the annular wall 44 of the support means 21.

In this manner, the belt tensioner 23 is fully assembled to the support means 21 and can be disposed in its operative position for tensioning the endless transmission belt construction 22 in a manner now to be described.

Once it is desired to cause the belt tensioner 23 to tension the belt construction 22, an appropriate tool 58 is inserted in the opening 60 of the arm 24 and is then utilized to rotate the arm 24 in the clockwise direction as represented by the arrow 61 in FIG. 8 to cause the outer end 30 of the spring 29 to have its side 30' be placed against the abutment 46 of the wall 44 of the support means 21 as the shoulder 72 of the part 69 of the rotating arm 24 moves out of engagement with the surface 30' of the outer end 30 of the spring 29 so that the outer end 30 of the spring 29 is now operatively interconnected to the support means 21, such rotation of the arm 24 in the clockwise direction as illustrated in FIGS. 8 and 11 by the arrow 61 causing the inner end 31 of the spring 29 to be moved in a direction to further wind up the spring 29. In this manner, when the side 27 of the belt 22 is placed against the surface 26 of the pulley 25 in the manner illustrated in FIGS. 1, 8 and 12, the force of the spring 29 tending to unwind the spring 29 is now applied against the side 27 of the belt construction 22 as represented by the arrow 28 in FIG. 12 to tension the belt construction 22 in a manner well known in the art. Such tensioning position of the belt tensioner 23 has the arm 24 with its surfaces 55 and 56 disposed intermediate the surfaces 53 and 54 on the support means 21 as illustrated in FIG. 12.

When it is desired to remove the belt tensioner 23 from the support means 21, the belt construction 22 is removed from contact with the pulley 25 and the arm 24 is permitted to move in a counter clockwise direction until the stop surface 55 thereof engages against the stop surface 53 of the support means 21 at which time the shoulder 72 of the part 69 of the rotating arm 24 now comes into engagement with the surface 30' of the outer end 30 of the spring 29 and, in effect, removes the surface 30' of the outer end 30 of the spring 29 from the abutment 46 of the support means 21 so that the outer end 30 of the spring 29 is no longer operatively interconnected to the support means 21. At this time, the fastening member 40 can be removed from the threaded opening 38 of the support means 21 and the belt tensioner 23 can be removed as a self-contained unit from the support means 21 as the spring 29 is carried thereby.

Thus, another belt tensioner 23 of this invention can now be utilized with the support means 21 in the manner previously set forth should the reason for having removed the previous belt tensioner 23 be to replace the same.

In any event, it can be seen that this invention not only provides a new belt tensioning system and a new belt tensioner therefor, but also this invention provides new methods of making such a new belt tensioning system and such a new belt tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a belt tensioner for a belt tensioning system that comprises a support means having an abutment means and an endless transmission belt construction carried by said support means and arranged to move in a certain path relative to said support means, said tensioner comprising an arm adapted to be pivotally mounted to said support means, a pulley rotatably carried by said arm and being adapted to be in engagement with said belt construction, and a wound coiled spring having opposed ends one of which is adapted to be operatively interconnected to said abutment means of said support means and the other of which is operatively interconnected to said arm whereby the force of said wound coiled spring is adapted to pivot said arm in a direction that urges said pulley against said belt construction with a force that tensions said belt construction, said arm having a shoulder means that is held engaged by said one of said opposed ends of said wound coiled spring by the force of said wound coiled spring so as to permit insertion and removal of said arm and said wound coiled spring as a self-contained unit to and from said support means when said arm is pivoted to a certain position where said shoulder means of said arm engages said one end of said wound coiled spring and effectively holds said one end of said wound coiled spring out of contact with said abutment means of said support means, said wound coiled spring comprising a helical spring having said opposed ends thereof comprising an inner end and an outer end, said arm having an opening therethrough, a tubular bushing means having a portion thereof disposed in said opening, and a fastening member having a portion thereof disposed in said portion of said tubular bushing means and having a projecting end for mounting said arm to said support means, the improvement wherein said portion of said fastening member and said portion of said tubular bushing means respectively have securing means cooperating together to hold said portion of said fastening member in said portion of said tubular bushing means in assembled relation therewith and wherein said tubular bushing means and said arm respectively have securing means cooperating together to hold said portion of said tubular bushing means in said opening of said arm.

2. A belt tensioner as set forth in claim 1 wherein said wound coiled spring comprises a substantially flat wire helical spring.

3. A belt tensioner as set forth in claim 1 wherein said arm has surface means adapted to be disposed for movement relative to a cylindrical hub of said support means.

4. A belt tensioner as set forth in claim 1 wherein said fastening member is rotatably carried by said arm.

5. A belt tensioner as set forth in claim 4 wherein said arm is rotatably disposed on said fastening member.

6. A belt tensioner as set forth in claim 5 wherein said tubular bushing means is disposed between said fastening member and said arm to facilitate rotational movement therebetween.

7. A belt tensioner as set forth in claim 6 wherein said tubular bushing means has an annular flange engaging said arm, said fastening member having an enlarged head for compacting said annular flange against said arm.

8. A belt tensioner as set forth in claim 1 wherein said shoulder means of said arm comprises a part having a pair of posts extending therefrom, said arm having a pair of openings therein respectively receiving said posts therein.

9. A belt tensioner as set forth in claim 1 wherein said securing means of said fastening member comprises an annular groove in said fastening member, said securing means of said tubular bushing means that cooperates with said securing means of said fastening member comprising an annular projection disposed in said annular groove.

10. A belt tensioner as set forth in claim 1 wherein said securing means that cooperate together to hold said portion of said tubular bushing means in said opening of said arm comprise snap-fit means.

* * * * *